3,499,079
SYNERGISTIC INSECTICIDE
Takemasa Takakusu, Hiratsuka, Shigemichi Aida, Yokohama, and Masaru Kado, Shimizu, Japan, assignors to Kumiai Chemical Industry Co., Ltd., Tokyo, Japan
No Drawing. Continuation-in-part of application Ser. No. 554,656, June 1, 1966. This application May 6, 1968, Ser. No. 727,038
Claims priority, application Japan, July 20, 1965, 40/43,506
Int. Cl. A01n 9/36
U.S. Cl. 424—200                5 Claims

ABSTRACT OF THE DISCLOSURE

Synergistic insecticides consisting of O,O-diethyl-S-benzyl-thiolophosphate and at least one compound selected from the group consisting of O,O-dimethyl-O-3-methyl-4-nitrophenylthionophosphate, 2,2,2-trichloro - 1-hydroxyethyldimethylphosphonate, and O,O-diethyl-O-(2-isopropyl-4-methyl-6-pyrimidyl) thionophosphate as active ingredient, and an inert carrier; and a method for combating insects by using such synergistic insecticides.

CROSS REFERENCE TO RELATED APPLICATION

This application is a continuation-in-part of our copending application, Serial No. 554,656 filed June 1, 1966 now abandoned.

The present invention relates to synergistic insecticides comprising O,O-diethyl-S-benzylthiolophosphate (referred to as EBP hereinafter) and at least one compound selected from the group consisting of O,O-dimethyl-O-3-methyl 4-nitrophenylthionophosphate (referred to as MEP hereinafter), 2,2,2-trichloro - 1 - hydroxyethyldimethylphosphonate (referred to as DEP hereinafter) and O,O-diethyl-O-(2-isopropyl-4-methyl-6 - pyrimidyl)thionophosphate (diadinon) as active ingredient.

The object of this invention is to provide insecticides of enhanced contact poison and stomach toxicity against a wide variety of insects which are harmful directly or indirectly. Another object is to provide an economical method for controlling a wide variety of harmful insects.

Some insecticides such as parathion, DEP, MEP and diadinon, which have been used for rice plant, show remarkable effectiveness against rice stem borers and plant hoppers but poor activity against leaf hoppers, while some insecticides have excellent activity against leaf hoppers but poor activity against rice stem borers. When such insecticides are used separately, it is impossible to obtain complete control of all kinds of harmful insects in the rice field.

Of course, the control of harmful insects can be attained by selecting a suitable composition for each harmful insect and carrying out each treatment at the most suitable period, but for controlling harmful insects in which the suitable period of control coincides, it is preferable to mix and use compositions active for each harmful insect in order to minimize the cost of composition and labor.

Various mixed compositions of agricultural chemicals have been developed, and consequently populations of the important agricultural pests have been greatly decreased recently.

The inventors have made various investigations on the insecticidal synergism of DEP, MEP, Parathion and others which have a relatively poor activity against leaf hoppers, by mixing them with EBP which is known as an excellent fungicide for rice blast (*Piricularia oryzae*) and has some insecticidal properties for green rice leaf hopper, and have found that the mixtures act with excellent effect on the plant hopper and leaf hopper, that is, the synergistic effect which can be obtained by mixing, gives good control in very low doses as compared with doses of them employed separately.

Though many of the insecticides used in this work are novel and effective, the development of their synergistic activity in combination with EBP has never been disclosed in any prior literature. The synergistic combinations of the present invention have such features that an excellent activity in controlling harmful insects can be obtained using a very low dose of the mixture as compared with the doses when using each insecticide separately. Therefore the cost of the composition necessary to control the harmful insects is lower, and moreover a wide range of harmful insects can be controlled.

In using EBP mixed with other insecticidal ingredients as an insecticide, the ingredients can be mixed and ground with solid carriers such as various clays, pyrophilite, pulp, diatomaceous earth, silica, and vermiculite, and/or with a suitable wetting agent. To make a liquid formulation, a combination of the active ingredients can be suspended or mixed with a liquid carrier, such as water, benzene, kerosene, alcohol, acetone, xylene, methylnaphthalene, cyclohexanone, animal or vegetable oil, fatty acid, fatty acid ester or surfactant, and then the mixture is emulsified with water.

The invention will be explained in more detail with reference to the following illustrative examples, but the amounts of additives can be varied in a wide range.

Example 1.— Powder

One percent by weight of EBP, 2% by weight of MEP, 3% by weight of diatomaceous earth and 94% by weight of mixture of talc and kaolin are mixed and ground and the resulting powder is dispersed.

Example 2.—Wettable powder

Five percent by weight of EBP, 10% by weight of MEP, 40% by weight of diatomaceous earth, 40% by weight of kaolin and 5% by weight of wetting agent of Solpole (Trade Mark) are mixed and ground and the resulting mixture is suspended in water, which is used as a dispersing liquid.

By using these compositions, insects harmful to agriculture can be controlled with an excellent activity. The development of the high activity due to the mixture will be explained with reference to the following experimental examples.

Experimental Example 1.—Insecticidal experiment against green rice leaf hopper

Leaves of rice plant were immersed in a liquid composition diluted to a given concentration (adding spreader) and after being air-dried, are covered with a wire gauze, in which insects to be tested were put and after 24 hours the ratio of insects killed was determined. The experiment was repeated three times.

|  | EBP | | MEP | | (*) | |
|---|---|---|---|---|---|---|
| Concentration of active ingredient (p.p.m.) | Number of insects to be tested | Ratio of insects killed (percent) | Number of insects to be tested | Ratio of insects killed (percent) | Number of insects to be tested | Ratio of insects killed (percent) |
| 400 | 44 | 54.2 | 41 | 85.5 | | |
| 200 | 47 | 19.1 | 44 | 77.3 | 47 | 91.5 |
| 100 | 46 | 4.3 | 38 | 55.2 | 44 | 75.0 |
| 50 | 48 | 4.2 | 36 | 33.0 | 39 | 59.0 |
| 25 | | | 41 | 17.1 | 46 | 37.0 |
| 12.5 | | | 42 | 11.9 | 34 | 29.4 |

* Mixture of EBP and MEP in ratio of 1:1.
NOTE.—The mixture concentrations of the composition is the sum of both compounds.

Experimental Example 2.—Insecticidal experiment against smaller brown plant hopper and brown plant hopper Leaves of rice plant were immersed in the composition liquid diluted to a given concentration (adding spreader) and after being air-dried and then covered with a wire gauze, in which insects to be treated were put and after 24 hours the ratio of insects killed was determined. The experiment was repeated three times.

a. Effect against smaller brown plant hopper.

|  | EBP | | MEP | | (*) | |
|---|---|---|---|---|---|---|
| Concentration of active ingredient (p.p.m.) | Number of insects to be tested | Ratio of insects killed (percent) | Number of insects to be tested | Ratio of insects killed (percent) | Number of insects to be tested | Ratio of insects killed (percent) |
| 1,600 | 49 | 85.5 | | | | |
| 800 | 49 | 59.2 | | | | |
| 400 | 47 | 19.3 | | | | |
| 200 | 53 | 5.7 | | | | |
| 16 | | | 57 | 94.8 | 47 | 93.6 |
| 8 | | | 42 | 74.1 | 46 | 84.4 |
| 4 | | | 47 | 34.1 | 63 | 61.9 |
| 2 | | | 54 | 25.9 | 53 | 32.1 |
| 1 | | | 63 | 9.5 | 60 | 13.3 |

* Mixture of EBP and MEP in ratio of 1:1.

b. Effect against brown plant hopper.

|  | EBP | | MEP | | (*) | |
|---|---|---|---|---|---|---|
| Concentration of active ingredient (p.p.m.) | Number of insects to be tested | Ratio of insects killed (percent) | Number of insects to be tested | Ratio of insects killed (percent) | Number of insects to be tested | Ratio of insects killed (percent) |
| 800 | 45 | 88.9 | | | | |
| 400 | 45 | 66.7 | | | | |
| 200 | 46 | 23.9 | | | | |
| 100 | 48 | 6.3 | | | | |
| 32 | | | 46 | 95.6 | | |
| 16 | | | 56 | 80.4 | 49 | 97.9 |
| 8 | | | 55 | 53.9 | 44 | 90.9 |
| 4 | | | 47 | 40.4 | 43 | 55.8 |
| 1 | | | 53 | 17.0 | 54 | 38.9 |
| 2 | | | 42 | 4.8 | 48 | 14.6 |

* Mixture of EBP and MEP in ratio of 1:1.

Experimental Example 3.—Insecticidal experiment against Azuki-bean weevil

Each active ingredient was dissolved in acetone and the solution having a given concentration was poured into a small Petri dish in such a manner that a solution is spread on the bottom uniformly and the solvent was evaporated at room temperature. Azuki-bean weevils (25/1 dish) were placed in the Petri dish, which was kept at a constant temperature of 25° C. for 24 hours and then ratio of insects killed was determined. LD-29 was determined by the conventional Probit method. The mixture of the corresponding amounts of LD-29 (ingredient components) of EBP and each active ingredient was treated as described above to determine ratio of insects killed.

| Ingredients | Mixture ratio of EBP to the other ingredients | Found ratio of insects killed (percent) | Calculated ratio of insects killed (percent) |
|---|---|---|---|
| MEP:EBP | LD-29:LD-29 | 82.5 | 50 |
| DEP:EBP | LD-29:LD-29 | 97.5 | 50 |
| Diadinon:EBP | LD-29:LD-29 | 96.0 | 50 |

The term "calculated ratio of insects killed" used in the above table means ratio wherein EBP and the other active ingredients act independently, that is, in case of the independent combination function according to the conception of S. Sakai (1960) and the numerical analysis is as follows:

$$Pm = 1 - (1-P_A)(1-P_B)$$

wherein $Pm$ is ratio of insects killed by the mixed composition, and $P_A$ and $P_B$ are respectively ratios of insects killed developed by each dose of the active ingredients.

$$Pm = 1 - \left(1 - \frac{29}{100}\right)\left(1 - \frac{29}{100}\right) = 1 - \frac{5041}{10000} \doteqdot 0.5$$

That is, $Pm$ is 50% of ratio of insects killed, so that the ratio of insects killed obtained by the insecticides according to the present invention is considerably larger than the ratio of insects killed of 50%, which is expected from activity of each ingredient.

What is claimed is:

1. A synergistic insecticide consisting essentially of 1 part by weight of O,O-diethyl-S-benzyl-thiolophosphate and 1 to 2 parts by weight of at least one compound selected from the group consisting of O,O-dimethyl-O-3-methyl - 4 - nitrophenylthionophosphate, 2,2,2 - trichloro-1-hydroxyethyldimethylphosphonate and O,O-diethyl-O-(2-isopropyl-4-methyl-6-pyrimidyl) thionophosphate as active ingredients, and an inert carrier.

2. A synergistic insecticide according to claim 1, wherein said compound is 2,2,2-trichloro-1-hydroxyethyldiphenylthionophosphate.

3. A synergistic insecticide according to claim 1, wherein said compound is 2,2,2-trichloro-2-hydroxyethyldimethylphosphonate.

4. A synergistic insecticide according to claim 1, wherein said compound is O,O-diethyl-O-(2-isopropyl-4-methyl-6-pyrimidyl) thionophosphate.

5. A method for combating insects which comprises applying to insects a combating amount of a synergistic insecticide consisting essentially of 1 part by weight of O,O-diethyl-S-benzyl-thiolophosphate and 1 to 2 parts by weight of at least one compound selected from the group consisting of O,O-dimethyl-O-3-methyl-4-nitrophenylthionophosphate, 2,2,2 - trichloro - 1 - hydroxy - ethyldimethyl-phosphate and O,O - diethyl - O - (2-isopropyl-4-methyl-6-pyrimidyl) thionophosphate as active ingredients, and an inert carrier.

No references cited.

LEWIS GOTTS, Primary Examiner

S. K. ROSE, Assistant Examiner

U.S. Cl. X.R.
424—218, 222, 224